April 20, 1937.  H. L. MEAD  2,077,766
VALVE SEATING WASHER
Filed Nov. 9, 1935
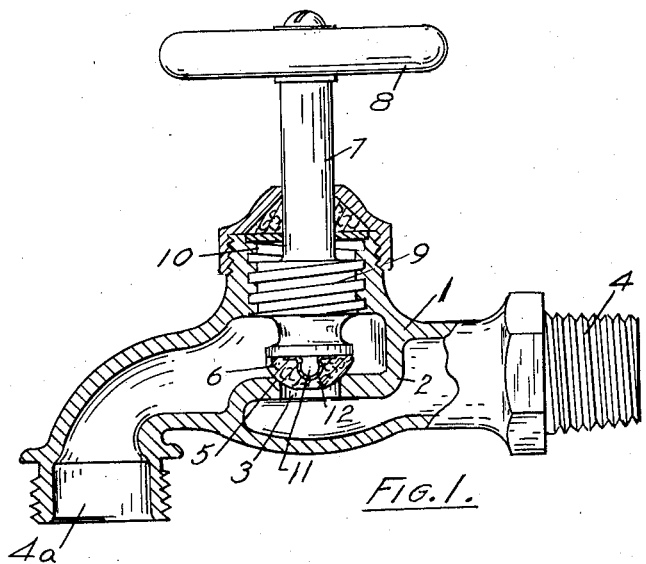
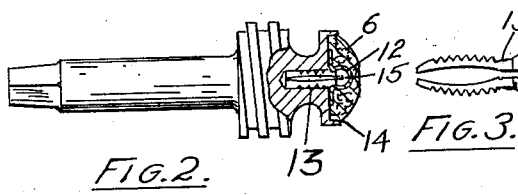
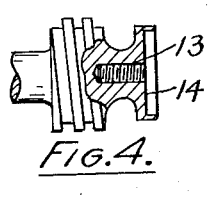
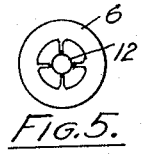
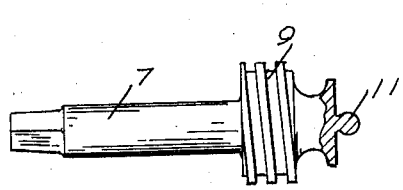
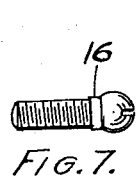
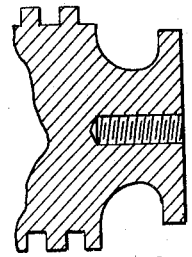
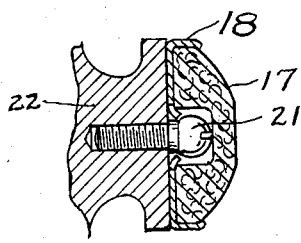
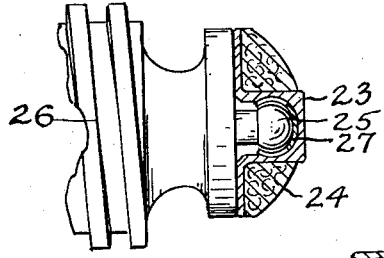
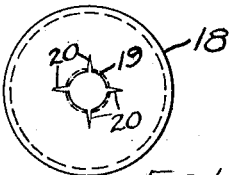
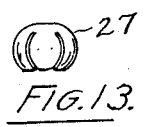
INVENTOR.
Henry L. Mead
BY Florian G. Miller
ATTORNEYS.

Patented Apr. 20, 1937

2,077,766

UNITED STATES PATENT OFFICE 2,077,766

VALVE SEATING WASHER

Henry L. Mead, Erie, Pa.

Application November 9, 1935, Serial No. 49,072

6 Claims. (Cl. 251—46)

This invention relates generally to faucets, but more particularly to seating washers on the movable valve stem.

All devices of this character made according to the prior art and with which I am familiar, were attached rigidly to the movable valve stem resulting in the wearing away and destruction of the seating washer in a very short time requiring renewal of the washer and permitting leakage through the valve opening and considerable chattering. This wearing away of the washer was due to friction between the seating washer and the seat when the port was closed by turning the valve stem and this friction also tended to wear away the surface of the seat requiring regrinding to prevent leakage and chattering. The renewal of the washer required considerable time and in some of the constructions the pressure of the water was depended upon to lift the washer away from the valve seat. Apertures were provided in the gaskets or washers in order to attach them to the stem which weakened them considerably and also provided a point of leakage after a very short period of operation.

It is, accordingly, an object of my invention to provide a seating washer on a valve stem which is easily removable and which does not rotate with the valve stem when the washer is in contact with the valve seat.

Another object of my invention is to provide a seating washer which is simple in construction, easy to attach, efficient in operation, and economical in cost.

Another object of my invention is to provide a seating washer which has a universal connection and which seats completely on the valve seat.

Another object of my invention is to provide an efficient attaching means for a seating washer which withdraws the washer away from its seat upon the rotation of the valve stem.

Another object of my invention is to provide a seating washer which presents a solid surface to the flow of fluid from the inlet to the outlet portion of the faucet.

Other objects will become evident from the following detailed description, taken in conjunction with the accompanying drawing, in which Fig. 1 is a side elevational view in cross-section of a faucet showing my improved seating washer attached to the valve stem.

Fig. 2 is a side elevational view of a conventional valve stem showing the use of my improved seating washer with a previously constructed valve stem.

Fig. 3 is a side elevational view of a headed spring stud used as part of the attaching means for my improved seating washer.

Fig. 4 is a fragmentary side elevational view of the valve stem shown in Fig. 2 without my seating washer attached thereto.

Fig. 5 is a view taken from the bottom of the seating washer showing the flexible socket formed integral therewith.

Fig. 6 is a side elevational view of a valve stem wherein the projecting head is formed integral with the stem.

Fig. 7 is a side elevational view of a headed screw bolt for use with my new seating washer.

Fig. 8 is a fragmentary side elevational view in cross-section of a conventional valve stem without the flanges.

Fig. 9 is a fragmentary side elevational view in cross-section showing a modified form of seating washer construction.

Fig. 10 is a fragmentary side elevational view of a valve stem with the washer in cross-section showing another modified form of construction.

Fig. 11 is a view taken from the bottom of the cup member holding the washer shown in Fig. 9.

Fig. 12 is a side elevational view in cross-section of the washer construction shown in Fig. 10.

Fig. 13 is a side elevational view of the snap cap which is disposed on the projecting head in the construction shown in Fig. 10.

Referring to the drawing, the assembly shown in Fig. 1 discloses a conventional faucet comprising a body 1 having a web 2 and a port 3 leading from the inlet 4 to the outlet 4a of the faucet. A valve seat 5 is formed on the periphery of the port 3 and receives a seating washer 6 attached to a movable valve stem 7. A handle 8 is utilized for rotating the stem 7 and the engaging threaded portions 9 and 10 on the stem 7 and the body 1 of the faucet respectively cause the vertical movement of the stem 7 when the stem 7 is rotated. The seating washer 6 is preferably made of a rubber composition but any suitable material may be used in its manufacture.

The attaching means for the washer 6 comprise a projecting head 11 on the stem 7 and a flexible socket member 12 formed integral with the washer 6 as shown in Fig. 5. The flexible socket member 12 engages the head 11 with a slight snap action which attaches the washer 6 to the head 11 on the stem 6. This construction permits the washer to rotate freely and also permits its easy assembly and removal. It will be seen that when the washer 6 comes in contact with the seat 5, the washer 6 will not rotate thereby preventing any friction between the washer 6 and its seat 5. The flexible socket member 12 being formed in a material such as rubber composition gives to it a greater elasticity and therefore a longer life. It will be understood that the washer 6 is ordinarily constructed with an unbroken face although this construction is not necessary for the efficient operation of this washer.

My invention may be applied to conventional type valve stems now in use as is shown in Fig. 2. Conventional type valve stems are provided with a threaded aperture 13 and an open cup shaped portion 14. By thrusting a spring stud 15 (shown in Fig. 3) into the aperture 13 or screwing into the aperture 13 a headed screw bolt 16 (shown in Fig. 7) a projecting head is provided to engage the flexible socket 12 of the washer 6.

A modified form of construction is shown in Fig. 9 wherein the washer 17 is disposed in a metal cup 18, the bottom view of which is shown in Fig. 11. The aperture 19 provided in the bottom portion of the cup 18 is made slightly flexible by providing radial split portions 20 to receive the projecting head 21 of the stem 22. A snap connection is therefore provided with all of the other advantages claimed for this type of washer.

Another modified form of construction is shown in Fig. 10 wherein a substantially rigid socket 23 is disposed in a washer 24. The stub head 25 integral with the stem 26 is preferably provided with a flexible cap (Fig. 13) 27 which fits over the stub head 25 to engage the bottom of the socket 23 providing a ball bearing surface. The cap 27 is of such construction and of such flexibility that a snap connection attaches the washer 24 to the head 25.

In all of the constructions described, a washer is provided which is movable rotatably to provide a perfect seal between the washer and its seat and to prevent friction between the washer and its seat when the stem is rotated to move the stem vertically. In all of the washers except the last one described, a washer surface is presented to the flow of water or to other fluids which is unbroken in any manner therefore preventing leakage and chattering and giving the washer longer life due to its greater strength.

Various changes may be made in the specific embodiment of the present invention without diverting from the spirit thereof, or within the scope of the appended claims.

What I claim is:

1. A device of the class described comprising a movable valve stem, a projecting member having a headed portion disposed on said valve stem, an unbroken faced washer, and a resilient socket member disposed in one side of said washer, said headed portion providing the male member and said socket member providing the female member of a snap fastener.

2. A device of the class described comprising a movable valve stem having a threaded bore, a headed projecting member disposed in said bore, an unbroken faced washer, and a resilient socket member disposed in one side of said washer, said socket member yieldingly engaging said headed projecting member to attach said washer to said stem but permitting rotatable movement of said washer on said headed member.

3. A device of the class described comprising a movable valve stem, a stub member projecting from said stem having a rounded head, a washer, and a resilient socket member disposed in said washer having the bottom portion thereof of semi-circular shape, said socket member yieldingly engaging said rounded head to attach said washer to said stem and to provide a ball bearing surface between the bottom of said socket and said head.

4. In a valve or faucet, a movable valve stem having a threaded bore, a quickly detachable projecting headed stud member on said stem disposed in said bore, a washer, and a resilient socket member formed integral with said washer yieldingly and rotatably engaging the head of said stud member, said stud member disposed to rotate in said socket member.

5. In a valve or faucet, a movable valve stem, a projecting headed stud member on said valve stem, a washer, and a resilient socket member secured to said washer yieldingly and rotatably engaging the headed portion of said stud member to permit said stud member to rotate in said socket.

6. In a valve or faucet, a movable valve stem having a projecting head, a washer, and a socket in said washer of substantially the same diameter as said projecting head in engagement with said projecting head through a snap connection, said head being free to rotate in the socket of said washer.

HENRY L. MEAD.